US009218212B2

(12) United States Patent
Do et al.

(10) Patent No.: US 9,218,212 B2
(45) Date of Patent: Dec. 22, 2015

(54) PAIRING PHYSICAL DEVICES TO VIRTUAL DEVICES TO CREATE AN IMMERSIVE ENVIRONMENT

(75) Inventors: Lydia M. Do, Raleigh, NC (US); William G. Pagan, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 241 days.

(21) Appl. No.: 13/294,348

(22) Filed: Nov. 11, 2011

(65) Prior Publication Data

US 2013/0125113 A1 May 16, 2013

(51) Int. Cl.
G06F 9/455 (2006.01)
G06F 9/46 (2006.01)
G06F 15/173 (2006.01)
G06F 9/50 (2006.01)

(52) U.S. Cl.
CPC .............. *G06F 9/5044* (2013.01); *G06F 9/455* (2013.01); *G06F 9/45558* (2013.01); *G06F 9/50* (2013.01); *G06F 9/5005* (2013.01); *G06F 9/5011* (2013.01); *G06F 9/5016* (2013.01); *G06F 9/5027* (2013.01); *G06F 9/5055* (2013.01); *G06F 2009/45562* (2013.01); *G06F 2009/45579* (2013.01); *G06F 2009/45583* (2013.01); *G06F 2009/45595* (2013.01)

(58) Field of Classification Search
None
See application file for complete search history.

(56) References Cited

U.S. PATENT DOCUMENTS

| 7,093,007 | B2 | 8/2006 | Patton et al. | |
|---|---|---|---|---|
| 7,877,247 | B2 | 1/2011 | Nahata et al. | |
| 7,945,436 | B2 | 5/2011 | Ang et al. | |
| 2003/0120718 | A1* | 6/2003 | Patton et al. | 709/202 |
| 2005/0220080 | A1* | 10/2005 | Ronkainen et al. | 370/352 |
| 2005/0278722 | A1* | 12/2005 | Armstrong et al. | 718/104 |
| 2008/0059556 | A1* | 3/2008 | Greenspan et al. | 709/201 |
| 2008/0288578 | A1* | 11/2008 | Silfverberg | 709/203 |
| 2009/0061769 | A1 | 3/2009 | Zimbric et al. | |
| 2009/0138402 | A1 | 5/2009 | Chan et al. | |
| 2009/0156123 | A1 | 6/2009 | Kim | |
| 2009/0161963 | A1 | 6/2009 | Uusitalo et al. | |
| 2009/0228862 | A1 | 9/2009 | Bertelrud et al. | |
| 2009/0240814 | A1 | 9/2009 | Brubacher et al. | |

(Continued)

FOREIGN PATENT DOCUMENTS

CN 101727182 A 6/2010

OTHER PUBLICATIONS

Koul, "A Mechanism to Sync User Mobility in Real World and the Virtual World (Second Life)", IP.com Prior Art Database, IPCOM0000185330D, Jul. 21, 2009, pp. 1-10, IP.com, USA.

(Continued)

*Primary Examiner* — Charles Swift
(74) *Attorney, Agent, or Firm* — Edward J. Lenart; James R. Nock; Kennedy Lenart Spraggins LLP

(57) ABSTRACT

Pairing physical devices to virtual devices to create an immersive environment, including: identifying, by a device pairing module, a virtual device in a virtual environment; identifying, by the device pairing module, a physical device in a physical environment; and pairing, by the device pairing module, the virtual device in the virtual environment with the physical device in the physical environment such that the physical device in the physical environment delivers virtual environment content, wherein the virtual environment content is content being delivered to an object in the virtual environment.

18 Claims, 4 Drawing Sheets

(56) References Cited

U.S. PATENT DOCUMENTS

| | | | |
|---|---|---|---|
| 2009/0282404 A1* | 11/2009 | Khandekar et al. | 718/1 |
| 2010/0269109 A1* | 10/2010 | Cartales | 718/1 |
| 2010/0333037 A1 | 12/2010 | Pavlovski et al. | |
| 2011/0035494 A1* | 2/2011 | Pandey et al. | 709/224 |
| 2011/0060744 A1* | 3/2011 | Brignull et al. | 707/748 |
| 2011/0107329 A1* | 5/2011 | Betzler et al. | 718/1 |
| 2011/0131576 A1* | 6/2011 | Ikegaya et al. | 718/1 |
| 2011/0185068 A1* | 7/2011 | Schmieder et al. | 709/227 |
| 2011/0271276 A1* | 11/2011 | Ashok et al. | 718/1 |
| 2011/0289500 A1* | 11/2011 | Strutt | 718/1 |
| 2012/0089980 A1* | 4/2012 | Sharp et al. | 718/1 |
| 2012/0124580 A1* | 5/2012 | Bouchier et al. | 718/1 |
| 2012/0159481 A1* | 6/2012 | Anderson et al. | 718/1 |
| 2012/0204176 A1* | 8/2012 | Tian et al. | 718/1 |
| 2012/0297069 A1* | 11/2012 | Duchastel et al. | 709/226 |
| 2012/0297379 A1* | 11/2012 | Anderson et al. | 718/1 |
| 2013/0024545 A1* | 1/2013 | Sheppard et al. | 709/217 |

OTHER PUBLICATIONS

Han et al. ; "Controlling Virtual World by the Real World Devices With an MPEG-V Framework", 2010 IEEE International Workshop on Multimedia Signal Processing (MMSP'10), held Oct. 4-6, 2010, Saint-Malo, France, pp. 251-256, Institute of Electrical and Electronics Engineers (IEEE).

* cited by examiner

PAIRING PHYSICAL DEVICES TO VIRTUAL DEVICES TO CREATE AN IMMERSIVE ENVIRONMENT

BACKGROUND OF THE INVENTION

1. Field of the Invention

The field of the invention is data processing, or, more specifically, methods, apparatus, and products for pairing physical devices to virtual devices to create an immersive environment.

2. Description of Related Art

As online gaming and virtual collaboration/interaction becomes increasingly complex, there exists a need for these environments to take increasing advantage of real world resources in order to become increasingly immersive and add to the player's suspension of disbelief. Currently, gaming and virtual worlds are largely limited to the resources programmed into the in-game or in-world environment, and thus have limited content and scope. Controls for virtual devices (e.g. audio, visual, etc.) are rendered in-game or in-world without any knowledge of the hardware that is running the gaming or metaverse application. This is a limitation of the current art, especially as devices are becoming more intelligent and information is able to be passed onto any pervasive device.

SUMMARY OF THE INVENTION

Methods, apparatus, and products for pairing physical devices to virtual devices to create an immersive environment, including: identifying, by a device pairing module, a virtual device in a virtual environment; identifying, by the device pairing module, a physical device in a physical environment; and pairing, by the device pairing module, the virtual device in the virtual environment with the physical device in the physical environment such that the physical device in the physical environment delivers virtual environment content, wherein the virtual environment content is content being delivered to an object in the virtual environment.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
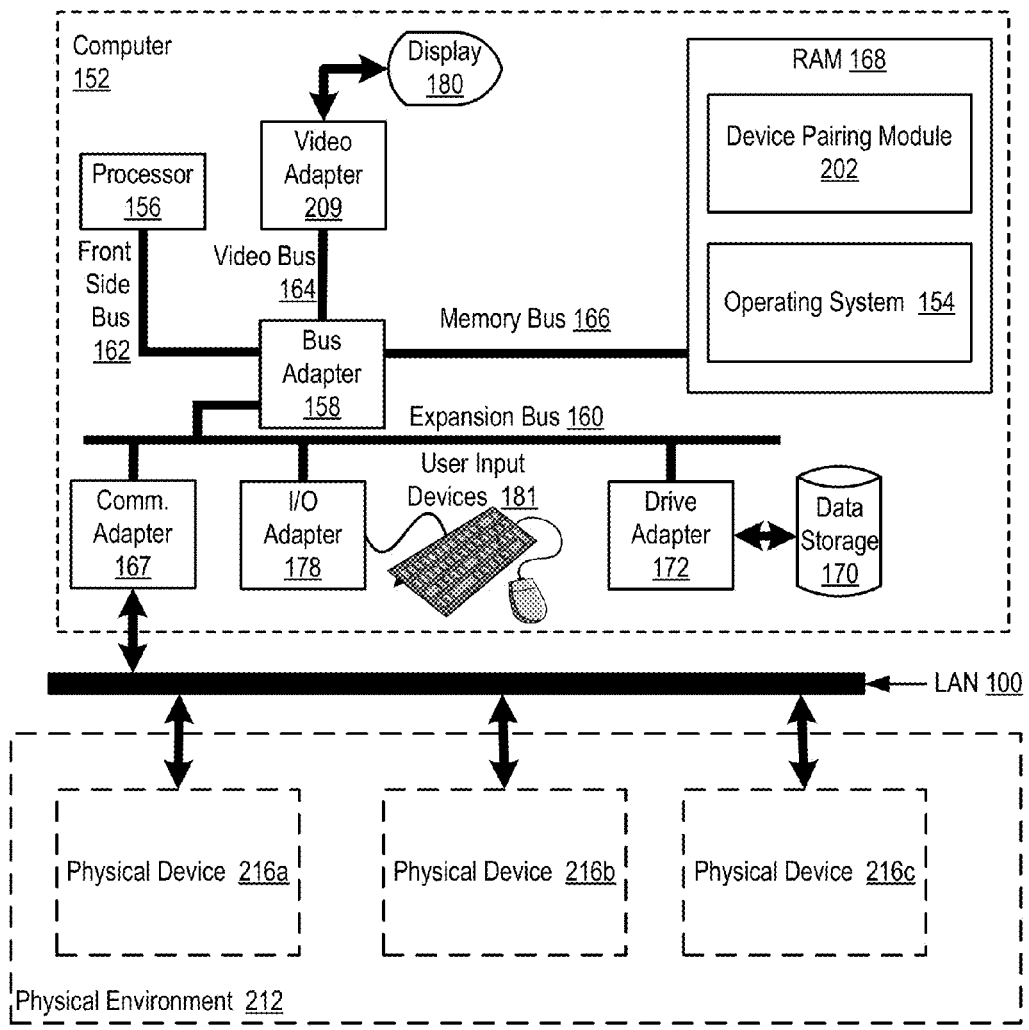
FIG. 1 sets forth a block diagram of automated computing machinery comprising an example computer useful in pairing physical devices to virtual devices to create an immersive environment according to embodiments of the present invention.

Example methods, apparatus, and products for pairing physical devices to virtual devices to create an immersive environment in accordance with the present invention are described with reference to the accompanying drawings, beginning with FIG. 1. FIG. 1 sets forth a block diagram of automated computing machinery comprising an example computer (152) useful in pairing physical devices to virtual devices to create an immersive environment according to embodiments of the present invention. The computer (152) of FIG. 1 includes at least one computer processor (156) or 'CPU' as well as random access memory (168) (RAM') which is connected through a high speed memory bus (166) and bus adapter (158) to processor (156) and to other components of the computer (152).

Stored in RAM (168) is a device pairing module (202), a module of computer program instructions improved for pairing physical devices (216a, 216, 216c) in a physical environment (212) to virtual devices in a virtual environment to create an immersive physical environment (212) according to embodiments of the present invention. A physical device (216a, 216, 216c) is a machine. Examples of a physical device (216a, 216, 216c) can include a mobile phone, a laptop computer, a tablet computer, a desktop computer, a wireless headset, and so on. Each physical device (216a, 216, 216c) resides in a physical environment (212) such as, for example, an office, a user's home, and so on. In the example of FIG. 1, a virtual environment is a simulated environment designed to replicate a real or imagined physical environment. Examples of such a virtual environment can include a simulated city in a video game, the cockpit of a simulated airplane in a video game, a simulated building in a gaming application, and so on. The virtual environment can include one or more virtual devices. Each virtual device is a simulated device designed to replicate a real or imaged physical device. Examples of such virtual devices can include, for example, the car radio of an automobile in a gaming application, a computer used by an avatar in a video game, and so on.

The device pairing module (202) of FIG. 1 can pair physical devices (216a, 216, 216c) in a physical environment (212) to virtual devices in a virtual environment to create an immersive physical environment (212) by identifying a virtual device in a virtual environment. Identifying a virtual device in a virtual environment may be carried out, for example, by inspecting all of the objects in the virtual environment. For example, gaming applications can be built using object-oriented techniques in which instances of objects are instantiated to create common virtual devices. For example, a gaming application may include instances of a 'radio' object that is designed to create an instance of a radio in a virtual environment. Identifying a virtual device in a virtual environment may therefore be carried out by inspecting all of instances of objects that are used to create the virtual environment and identifying which objects correspond to virtual devices. For example, if a virtual environment includes one instance of a 'radio' object, one instance of a 'horse' object, one instance of a 'phone' object, and one instance of a 'rainbow' object, the device pairing module (202) can determine that only the 'radio' object and the 'phone' object represent a virtual device.

The device pairing module (202) of FIG. 1 can also pair physical devices (216a, 216, 216c) in a physical environment (212) to virtual devices in a virtual environment to create an immersive physical environment (212) by identifying a physical device (216a, 216b, 216c) in a physical environment (212). Identifying a physical device (216a, 216b, 216c) in a physical environment (212) may be carried out through the use of device discovery protocols as well as service discovery protocols used by devices to advertise services and capabilities of the devices, or a single protocol that can be used for device discovery and service discovery. Examples of device discovery protocols can include the Link Layer Discovery Protocol ('LLDP'), Bluetooth Service Discovery Protocol ('SDP'), and others as will occur to those of skill in the art. Examples of service discovery protocols can include the Service Location Protocol ('SLP'), DNS Service Discovery ('DNS-SD'), Bluetooth SDP, and others as will occur to those of skill in the art. The discovery protocols may be used to identify all devices that the device pairing module (202) can communicate with, for example, over a data communications network such as LAN (100). The discovery protocols may also be used to discover all of the services made available by such devices. For example, the device pairing module (202) may determine that the device pairing module (202) can communicate with a smart phone and may further discover that the smart phone provides audio rendering services, video rendering services, messaging services, and so on.

The device pairing module (202) of FIG. 1 can pair physical devices (216a, 216, 216c) in a physical environment (212) to virtual devices in a virtual environment to create an immersive physical environment (212) by pairing the virtual device in the virtual environment with the physical device (216a, 216b, 216c) in the physical environment (212) such that the physical device (216a, 216b, 216c) in the physical environment (212) delivers virtual environment content. Virtual environment content is content being delivered to an object in the virtual environment. Examples of such content can include audio content being delivered to the character in the virtual environment via a virtual device, video content being delivered to the character in the virtual environment via a virtual device, informational content being delivered to the character in the virtual environment via a virtual device, and so on. The object in the virtual environment may be embodied, for example, as an avatar, as a first-person perspective of a virtual environment participant, as a character in a gaming application, and so on. Pairing the virtual device in the virtual environment with the physical device (216a, 216b, 216c) in the physical environment (212) may be carried out by associating the virtual device and physical device (216a, 216b, 216c) in a data structure such as a device pairing table discussed in greater detail below with reference to FIG. 2.

Also stored in RAM (168) is an operating system (154). Operating systems useful pairing physical devices (216a, 216b, 216c) to virtual devices to create an immersive environment according to embodiments of the present invention include UNIX™, Linux™, Microsoft XP™, AIX™, IBM's i5/OS™, and others as will occur to those of skill in the art. The operating system (154) and the device pairing module (202) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for pairing physical devices to virtual devices to create an immersive environment according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The example computer (152) of FIG. 1 includes a communications adapter (167) for data communications with other computers, including the physical devices (216a, 216b, 216c) in the physical environment (212), and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for pairing physical devices to virtual devices to create an immersive environment according to embodiments of the present invention include modems for wired dial-up communications, Ethernet (IEEE 802.3) adapters for wired data communications network communications, and 802.11 adapters for wireless data communications network communications.

Figure 2:
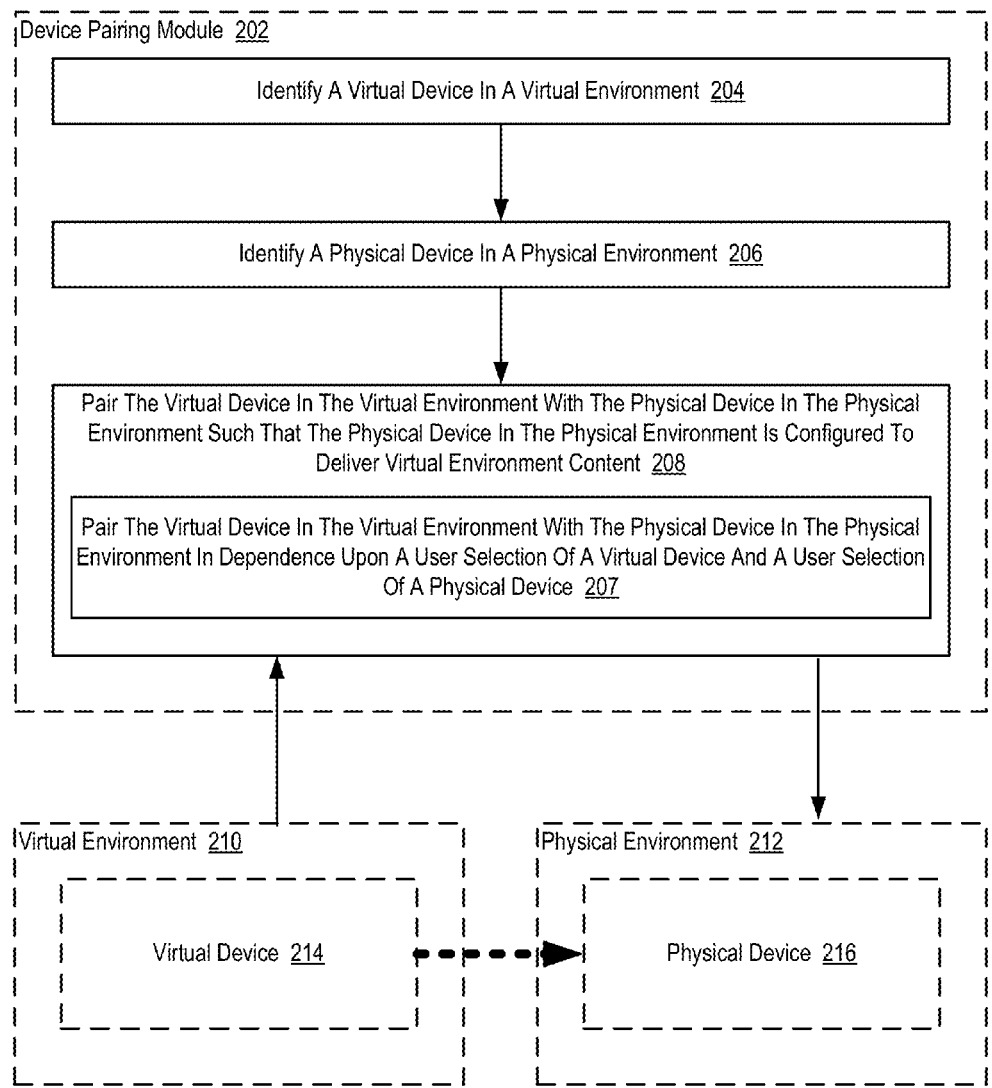
FIG. 2 sets forth a flow chart illustrating an example method for pairing physical devices to virtual devices to create an immersive environment according to embodiments of the present invention.

For further explanation, FIG. 2 sets forth a flow chart illustrating an example method for pairing physical devices in a physical environment to virtual devices in a virtual environment to create an immersive environment according to embodiments of the present invention. In the example of FIG. 2, a physical device (216) is a machine. Examples of a physical device (216) can include a mobile phone, a laptop computer, a tablet computer, a desktop computer, a wireless headset, and so on. Each physical device (216) resides in a physical environment (212) such as, for example, an office, a user's home, and so on. The example of FIG. 2 also includes a virtual device (214) that resides in a virtual environment (210). A virtual environment (210) is a simulated environment designed to replicate a real or imagined physical environment. Examples of such a virtual environment (210) can include a simulated city in a video game, the cockpit of a simulated airplane in a video game, a simulated building in a gaming application, and so on. The virtual environment (210) of FIG. 2 includes one or more virtual devices (214). Each virtual device (214) is a simulated device designed to replicate a real or imaged physical device. Examples of such virtual devices (214) can include, for example, the car radio of an automobile in a gaming application, a computer used by an avatar in a video game, and so on.

The example method of FIG. 2 includes identifying (204), by a device pairing module (202), a virtual device (214) in a virtual environment (210). The device pairing module (202) of FIG. 2 may be embodied as a module of computer programs instructions that, when executed, pair physical devices in physical environments to virtual devices in virtual environments so that the physical devices can deliver content in the physical environment that is being delivered by virtual devices in the virtual environment, thereby giving a user interacting with the virtual environment a more immersive experience as aspects of the virtual environment are being delivered to the user's physical environment. In the example method of FIG. 2, the device pairing module (202) may be executing on automated computing machinery configured for data communications with other devices. For example, the device pairing module (202) may be executing on a network connected computer that can communicate with a number of other devices over an IP-based data communications network.

In the example method of FIG. 2, identifying (204) a virtual device (214) in a virtual environment (210) may be carried out, for example, by inspecting all of the objects in the virtual environment (210). For example, gaming applications can be built using object-oriented techniques in which instances of objects are instantiated to create common virtual devices (214). For example, a gaming application may include instances of a 'radio' object that is designed to create an instance of a radio in a virtual environment. Identifying (204) a virtual device (214) in a virtual environment (210) may therefore be carried out by inspecting all of instances of objects that are used to create the virtual environment (210) and identifying which objects correspond to virtual devices. For example, if a virtual environment (210) includes one instance of a 'radio' object, one instance of a 'horse' object, one instance of a 'phone' object, and one instance of a 'rainbow' object, the device pairing module (202) can determine that only the 'radio' object and the 'phone' object represents a virtual device (214).

The example method of FIG. 2 also includes identifying (206), by the device pairing module (202), a physical device (216) in a physical environment (212). In the example method of FIG. 2, identifying (206) a physical device (216) in a physical environment (212) may be carried out through the use of device discovery protocols as well as service discovery protocols used by devices to advertise services and capabilities of the devices, or a single protocol that can be used for device discovery and service discovery. Examples of device discovery protocols can include the Link Layer Discovery Protocol ('LLDP'), Bluetooth Service Discovery Protocol ('SDP'), and others as will occur to those of skill in the art. Examples of service discovery protocols can include the Service Location Protocol ('SLP'), DNS Service Discovery ('DNS-SD'), Bluetooth SDP, and others as will occur to those of skill in the art. In the example method of FIG. 2, the discovery protocols may be used to identify all devices that the device pairing module (202) can communicate with and also to discover all of the services made available by such devices. For example, the device pairing module (202) may determine that the device pairing module (202) can communicate with a smart phone and may further discover that the smart phone provides audio rendering services, video rendering services, messaging services, and so on.

The example method of FIG. 2 also includes pairing (208), by the device pairing module (202), the virtual device (214) in the virtual environment (210) with the physical device (216) in the physical environment (212) such that the physical device (216) in the physical environment (212) delivers virtual environment content. In the example method of FIG. 2, virtual environment content is content being delivered to an object in the virtual environment (210). Examples of such content can include audio content being delivered to the character in the virtual environment (210) via a virtual device (214), video content being delivered to the character in the virtual environment (210) via a virtual device (214), informational content being delivered to the character in the virtual environment (210) via a virtual device (214), and so on. In the example method of FIG. 2, the object in the virtual environment (210) may be embodied, for example, as an avatar, as a first-person perspective of a virtual environment (210) participant, as a character in a gaming application, and so on.

In the example method of FIG. 2, pairing (208) the virtual device (214) in the virtual environment (210) with the physical device (216) in the physical environment (212) may be carried out by associating the virtual device (214) and physical device (216) in a data structure such as a device pairing table. Consider the device pairing table below:

TABLE 1

Device Pairing Table

| Virtual Device | Physical Device |
| --- | --- |
| Car Radio | Smart Phone |
| Phone | Smart Phone |
| Computer | Tablet Computer |

Table 1 illustrates an example Device Pairing Table in which three virtual devices were discovered in the virtual environment: a car radio that may be contained in a virtual car being driven by an avatar of the player of a gaming application, a phone used that may be used by the avatar of the player of the gaming application, and a computer that may be used by the avatar of the player of the gaming application. The car radio and the phone in the virtual environment are paired with a smart phone in a physical environment. The computer in the virtual environment is paired with a tablet computer in the physical environment. Through the use of such pairings, a more immersive environment can be created. Consider an example in which a user is playing a video game in which the pairings described in the example Device Pairing Table have been made. In such an example, a more immersive environment can be created by bringing aspects of the virtual environment into the user's physical environment. For example, a song playing on the car radio in the virtual environment can be played on the smart phone in the user's physical environment. Likewise, text messages delivered to the phone in the virtual environment can be sent to the smart phone in the user's physical environment.

Although the example depicted in Table 1 describes a situation in which multiple virtual devices are paired with a single physical device, readers will appreciate that multiple physical devices can also be paired with a single virtual device. Consider an example in which a virtual device in a virtual environment had a wide variety of capabilities, such as the ability to render audio content, render video content, send and receive messages, and so on. In such an example, the virtual device may be paired with multiple physical devices in such a way that one physical device would mirror one capability of the virtual device while another physical device would mirror another capability of the virtual device.

Readers will further appreciate that identifying (204) a virtual device (214) in a virtual environment (210), identifying (206) a physical device (216) in a physical environment (212), and pairing (208) the virtual device (214) in the virtual environment (210) with the physical device (216) in the physical environment (212) can be carried out in a variety of ways. In the example of FIG. 2, therefore, pairing (208) the virtual device (214) in the virtual environment (210) with the physical device (216) in the physical environment (212) can include pairing (207) the virtual device (214) in the virtual environment (210) with the physical device (216) in the physical environment (212) in dependence upon a user selection of a virtual device (214) and a user selection of a physical device (218). For example, a user may be presented with a list of virtual devices (214) in the virtual environment (210) that are available for pairing and a list of physical devices (216) in the physical environment (212) that are available for pairing. In such an embodiment, the user may subsequently select a particular virtual device (214) to pair with a particular physical device (216) through the use of a user interface presented to the user. If the user selects a virtual device (214) and a physical device (216) that cannot be paired, the user may receive an alert indicating that the devices cannot be paired.

In embodiments of the present invention, the list of virtual devices (214) in the virtual environment (210) that are available for user-selected pairing may be generated, for example, by a gaming application that is presenting the virtual environment (210). In such an example, the gaming application that is presenting the virtual environment (210) may simply list all virtual devices (214) that will be presented by the gaming application. Alternatively, the gaming application that is presenting the virtual environment (210) may receive information identifying the physical devices that the player has made available for pairing to virtual devices and subsequently generate the list of virtual devices (214) in the virtual environment (210) that are available for user-selected pairing in dependence upon the physical devices that the player of the gaming application has made available for pairing to virtual devices. Consider an example in which the only physical device that the player of the gaming application has made available for pairing to virtual devices is a stereo—a physical device only capable of rendering audio content. In such an example, the gaming application can generate a list of virtual devices (214) in the virtual environment (210) that are available for user-selected pairing that only includes virtual devices (214) that render audio content.

Readers will appreciate that a user's interaction is not limited to simply deciding which devices are to be paired. In fact, a user may even select different capabilities of each device that are to be paired. Consider an example in which the user decides to pair a virtual device (212) with both audio and video rendering capabilities with a physical device (216) that also includes both audio and video rendering capabilities. In such an example, the user may be presented with a list of capabilities for each device and determine to only pair a subset of such capabilities, for example, by only pairing each device such that the physical device (216) only renders audio content that is being delivered by the virtual device (212).

In alternative embodiments of the present invention, identifying (204) a virtual device (214) in a virtual environment (210), identifying (206) a physical device (216) in a physical environment (212), and pairing (208) the virtual device (214) in the virtual environment (210) with the physical device (216) in the physical environment (212) may be done taking into account a pairing of devices that have been utilized by other users. Consider an example in which a user is playing a gaming application that includes a virtual environment with one or more virtual devices. In such an example, virtual devices may be paired to physical devices in the same way that another player paired virtual devices and physical devices. For example, if a friend of the user paired a particular virtual device to a particular physical device while playing the same gaming application, the user may select the same pairing so that each player of the gaming application has a similarly immersive experience. In such an example, device pairing information can be maintained in a user profile or other data structure that may be made available to the device pairing module (202).

Figure 3:
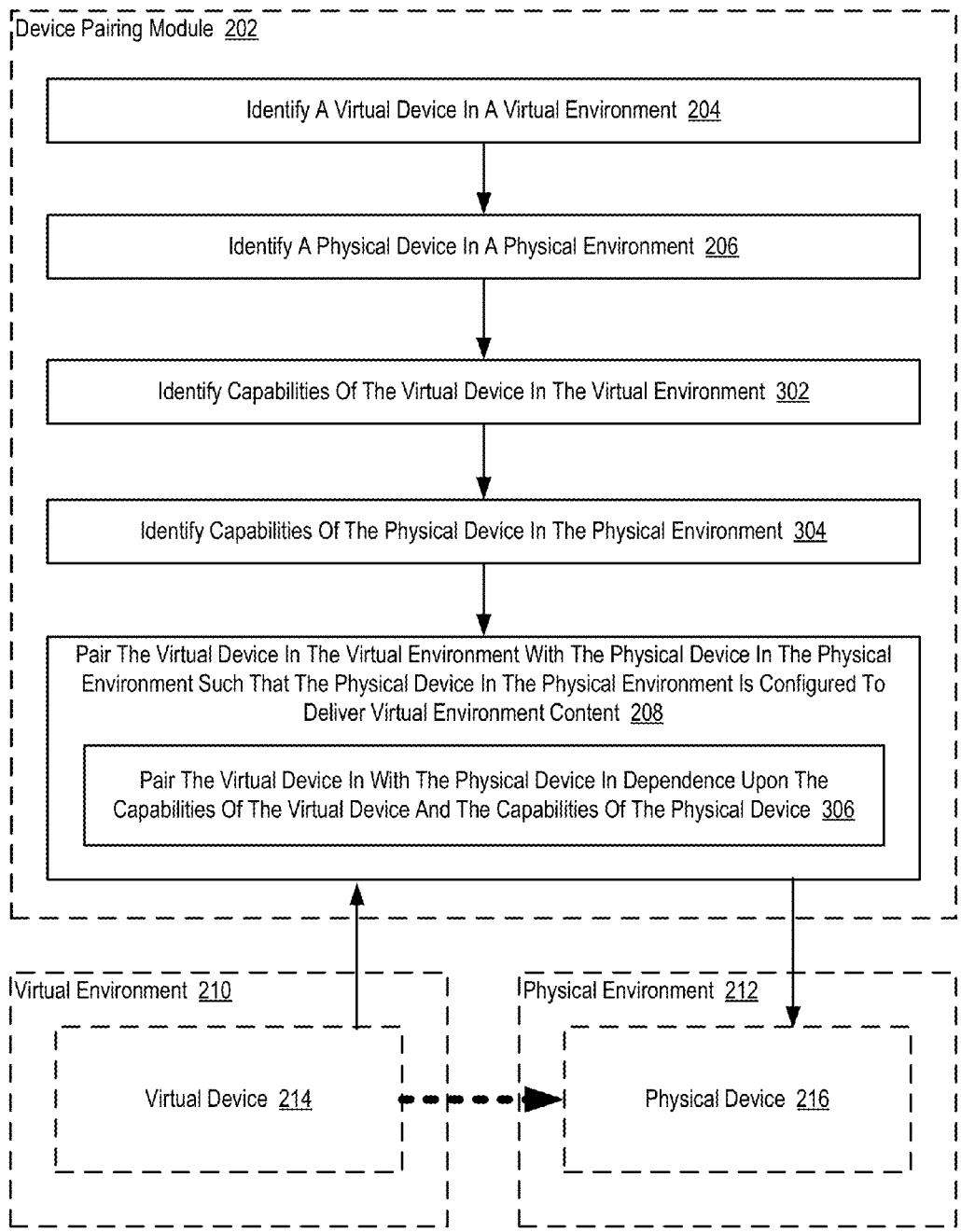
FIG. 3 sets forth a flow chart illustrating a further example method for pairing physical devices to virtual devices to create an immersive environment according to embodiments of the present invention.

For further explanation, FIG. 3 sets forth a flow chart illustrating an example method for pairing physical devices to virtual devices to create an immersive environment according to embodiments of the present invention. The example method of FIG. 3 is similar to the example method of FIG. 2 as it also includes identifying (204) a virtual device (214) in a virtual environment (210), identifying (206) a physical device (216) in a physical environment (212), and pairing (208) the virtual device (214) in the virtual environment (210) with the physical device (216) in the physical environment (212).

The example method of FIG. 3 also includes identifying (302), by the device pairing module (202), capabilities of the virtual device (214) in the virtual environment (210). In the example method of FIG. 3, identifying (302) capabilities of the virtual device (214) in the virtual environment (210) may be carried out, for example, by inspecting the properties associated with the object-oriented objects used to create the virtual device (214). As described above, gaming applications can be built using object-oriented techniques in which instances of objects are instantiated to create common virtual devices (214). For example, a gaming application may include instances of a 'phone' object that is designed to create an instance of a phone in a virtual environment. The 'phone' object may include variables associated with various device capabilities such as, for example, a variable to be used to specify that a device is capable of rendering audio content, a variable to be used to specify that a device is capable of rendering video content, a variable to be used to specify that a device is capable of receiving phone calls, a variable to be used to specify that a device is capable of receiving multimedia messaging service ('MMS') messages, and so on. Identifying (302) capabilities of the virtual device (214) in the virtual environment (210) may therefore be carried out by inspecting the values in each variable of such a 'phone' object that is designed to create an instance of a phone in a virtual environment (210).

The example method of FIG. 3 also includes identifying (304), by the device pairing module (202), capabilities of the physical device (216) in the physical environment (212). In the example method of FIG. 3, identifying (304) capabilities of the physical device (216) in the physical environment (212) may be carried out through the use of service discovery protocols such SLP, DNS-SD, Bluetooth SDP, and others as will occur to those of skill in the art. In the example method of FIG. 3, the service discovery protocols may be used to identify all of the services made available by each physical device (216) in the physical environment (212). For example, the device pairing module (202) may determine a smart phone in the physical environment (212) provides audio rendering services, video rendering services, messaging services, and so on.

In the example method of FIG. 3, pairing (208) the virtual device (214) in the virtual environment (210) with the physical device (216) in the physical environment (212) includes pairing (306) the virtual device (214) in with the physical device (216) in dependence upon the capabilities of the virtual device (214) and the capabilities of the physical device (216). Pairing (306) the virtual device (214) in with the physical device (216) in dependence upon the capabilities of the virtual device (214) and the capabilities of the physical device (216) may be carried out, for example, by pairing devices that have compatible capabilities. Consider an example in which the virtual environment (210) includes a radio capable of rendering audio content and a display screen capable of rendering video content. In the same example, assume that the physical environment (212) includes a smart phone that can render audio content but cannot render video content. In such an example, the radio in the virtual environment (210) may be paired (306) with the smart phone in the physical environment (212) because each device has compatible capabilities while the display screen in the virtual environment (210) will not be paired (306) with the smart phone in the physical environment (212) because the capabilities of each device are not compatible.

Figure 4:
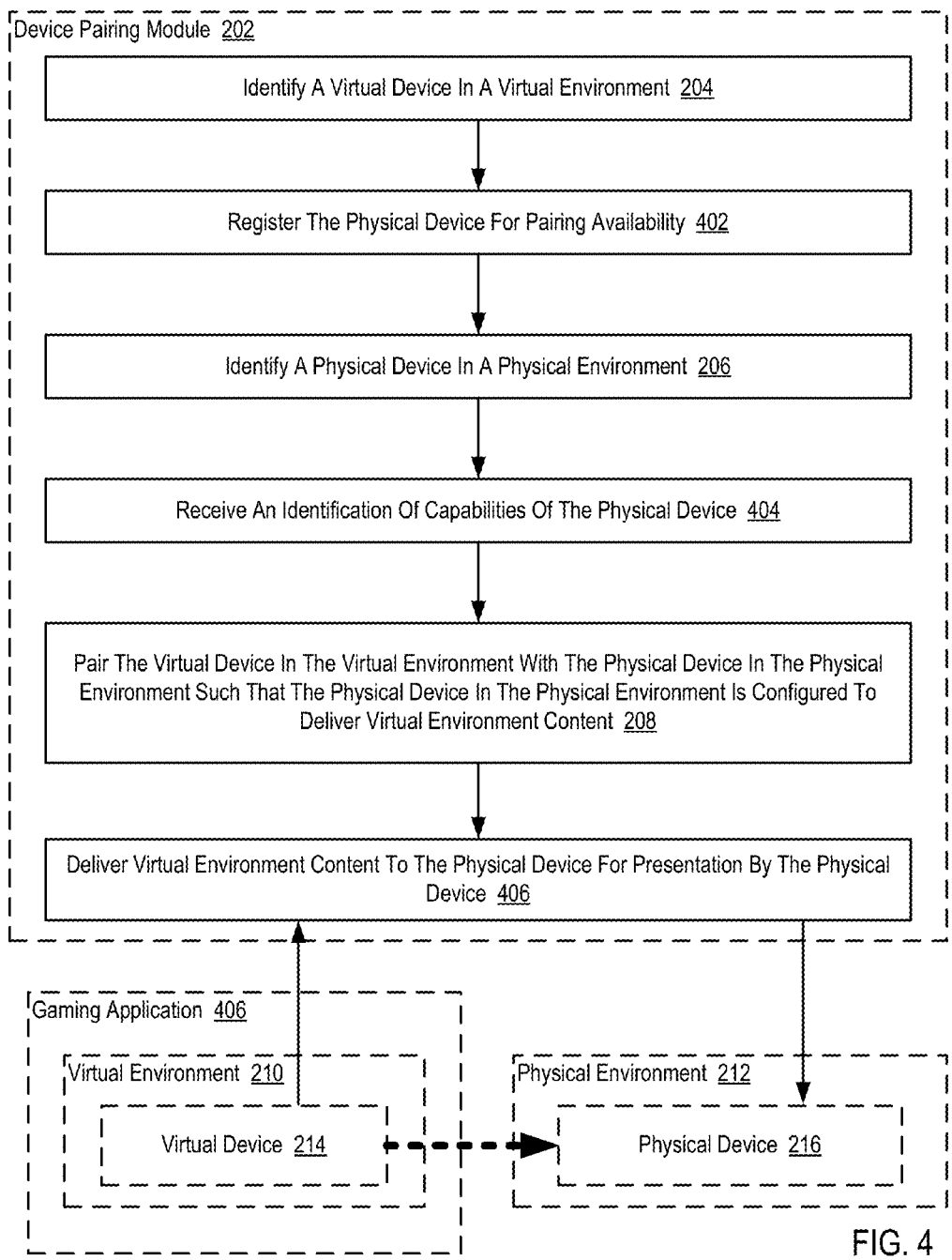
FIG. 4 sets forth a flow chart illustrating a further example method for pairing physical devices to virtual devices to create an immersive environment according to embodiments of the present invention.

For further explanation, FIG. 4 sets forth a flow chart illustrating an example method for pairing physical devices to virtual devices to create an immersive environment according to embodiments of the present invention. The example method of FIG. 4 is similar to the example method of FIG. 2 as it also includes identifying (204) a virtual device (214) in a virtual environment (210), identifying (206) a physical device (216) in a physical environment (212), and pairing (208) the virtual device (214) in the virtual environment (210) with the physical device (216) in the physical environment (212).

In the example method of FIG. 4, the virtual device (214) in the virtual environment (210) is presented as part of a gaming application (406). Such gaming applications (406) may be presented through a dedicated gaming console, through a mobile communications device such as a smart phone, through a computing device such as a personal computer or tablet computer, and through the use of other devices as may occur to those of skill in the art. The gaming application (406) may also interact with social media content providers, cloud computing environments, social gaming environments, and so on.

The example method of FIG. 4 includes registering (402), by the device pairing module (202), the physical device (216) for pairing availability. In the example method of FIG. 4, registering (402) the physical device (216) for pairing availability may be carried out by maintaining a table or other data structure of physical devices (216) in the physical environment (212) along with a flag indicating whether each physical device (216) may be utilized by the device pairing module (202). Whether a physical device (216) may be utilized by the device pairing module (202) for pairing with a virtual device (214) in a virtual environment (210) may be carried out, for example, by scanning a local network that the device pairing module (202) is connected to, finding all other devices that are connected to the same network, and presenting a user of the virtual environment (210) with a graphical user interface (GUI') through which the user can select physical devices (216) that are to be made available for pairing with virtual devices (210).

The example method of FIG. 4 also includes receiving (404), by the device pairing module (202), an identification of capabilities of the physical device (216). In the example method of FIG. 4, receiving (404) an identification of capabilities of the physical device (216) may be carried out through the use of service discovery protocols such SLP, DNS-SD, Bluetooth SDP, and others as will occur to those of skill in the art. In the example method of FIG. 4, the service discovery protocols may be used to identify all of the services made available by each physical device (216) in the physical environment (212). For example, the device pairing module (202) may receive information indicating that a smart phone in the physical environment (212) provides audio rendering services, video rendering services, messaging services, and so on.

The example method of FIG. 4 also includes delivering (406), by the device pairing module (202), virtual environment content to the physical device (216) for presentation by the physical device (216). In the example method of FIG. 4, virtual environment content is content being delivered to an object in the virtual environment (210). Examples of such content can include audio content being delivered to the character in the virtual environment (210) via a virtual device (214), video content being delivered to the character in the virtual environment (210) via a virtual device (214), informational content being delivered to the character in the virtual environment (210) via a virtual device (214), and so on. In the example method of FIG. 4, the object in the virtual environment (210) may be embodied, for example, as an avatar, as a first-person perspective of a virtual environment (210) participant, as a character in a gaming application (406), and so on.

In the example method of FIG. 4, delivering (406) virtual environment content to the physical device (216) for presentation by the physical device (216) may be carried out, for example, by delivering the content to the physical device (216) over an IP-based network, using a data communications connection that utilizes the Bluetooth protocol stack, and in other ways as will occur to those of skill in the art. Consider an example in which a user of a gaming console is playing a first-person video game in which a car radio in the gaming application (406) is playing a song on the car radio of an automobile being driven by the player. In such an example, the user of the gaming console can have in their physical environment (212) a smart phone and connected ear phones. Delivering (406) content being presented by the virtual device (214) to the physical device (216) for presentation by the physical device (216) may, in such an example, be carried out by sending the song to a smart phone that the car radio in the virtual environment (210) is paired with, so that the smart phone can play the song and deliver the audio content via the ear phones connected to the user's smart phone. The user may therefore experience a more immersive environment as the user hears the same thing as the first-person character in the virtual environment (210) would experience.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of pairing physical devices to virtual devices to create an immersive environment, the method comprising:
    identifying, by a device pairing module, a virtual device in a virtual environment, including identifying a type of content that can be delivered by the virtual device;
    identifying, by the device pairing module, a physical device in a physical environment, including identifying a type of content that can be delivered by the physical device; and
    pairing, by the device pairing module, the virtual device in the virtual environment with the physical device in the physical environment only if the type of content that can be delivered by the virtual device is identical to the type of content that can be delivered by the physical device, including:
        receiving, by the virtual device in the virtual environment, virtual environment content, wherein the virtual environment content is audio or visual content; and
        in response to the virtual device in the virtual environment receiving the virtual environment content, presenting, by the physical device in the physical environment, the virtual environment content received by the virtual device in the virtual environment.

2. The method of claim 1 further comprising:
    identifying, by the device pairing module, capabilities of the virtual device in the virtual environment;
    identifying, by the device pairing module, capabilities of the physical device in the physical environment; and wherein
    pairing, by the device pairing module, the virtual device in the virtual environment with the physical device in the physical environment includes pairing the virtual device in with the physical device in dependence upon the capabilities of the virtual device and the capabilities of the physical device.

3. The method of claim 1 further comprising registering, by the device pairing module, the physical device for pairing availability.

4. The method of claim 1 further comprising receiving, by the device pairing module, an identification of capabilities of the physical device.

5. The method of claim 1 wherein the virtual device in the virtual environment is presented as part of a gaming application.

6. The method of claim 1 wherein pairing the virtual device in the virtual environment with the physical device in the physical environment further comprises pairing the virtual device in the virtual environment with the physical device in the physical environment in dependence upon a user selection of a virtual device and a user selection of a physical device.

7. An apparatus for pairing physical devices to virtual devices to create an immersive environment, the apparatus comprising a computer processor, a computer memory operatively coupled to the computer processor, the computer memory having disposed within it computer program instructions that, when executed by the computer processor, cause the apparatus to carry out the steps of:
  identifying, by a device pairing module, a virtual device in a virtual environment, including identifying a type of content that can be delivered by the virtual device;
  identifying, by the device pairing module, a physical device in a physical environment, including identifying a type of content that can be delivered by the physical device; and
  pairing, by the device pairing module, the virtual device in the virtual environment with the physical device in the physical environment only if the type of content that can be delivered by the virtual device is identical to the type of content that can be delivered by the physical device, including:
    receiving, by the virtual device in the virtual environment, virtual environment content, wherein the virtual environment content is audio or visual content; and
    in response to the virtual device in the virtual environment receiving the virtual environment content, presenting, by the physical device in the physical environment, the virtual environment content received by the virtual device in the virtual environment.

8. The apparatus of claim 7 further comprising computer program instructions that, when executed by the computer processor, cause the apparatus to carry out the steps of:
  identifying, by the device pairing module, capabilities of the virtual device in the virtual environment;
  identifying, by the device pairing module, capabilities of the physical device in the physical environment; and wherein
  pairing, by the device pairing module, the virtual device in the virtual environment with the physical device in the physical environment includes pairing the virtual device in with the physical device in dependence upon the capabilities of the virtual device and the capabilities of the physical device.

9. The apparatus of claim 7 further comprising computer program instructions that, when executed by the computer processor, cause the apparatus to carry out the step of registering, by the device pairing module, the physical device for pairing availability.

10. The apparatus of claim 7 further comprising computer program instructions that, when executed by the computer processor, cause the apparatus to carry out the step of receiving, by the device pairing module, an identification of capabilities of the physical device.

11. The apparatus of claim 7 wherein the virtual device in the virtual environment is presented as part of a gaming application.

12. The apparatus of claim 7 wherein pairing the virtual device in the virtual environment with the physical device in the physical environment further comprises pairing the virtual device in the virtual environment with the physical device in the physical environment in dependence upon a user selection of a virtual device and a user selection of a physical device.

13. A computer program product for pairing physical devices to virtual devices to create an immersive environment, the computer program product disposed upon a non-transitory computer readable storage medium, the computer program product comprising computer program instructions that, when executed, cause a computer to carry out the steps of:
  identifying, by a device pairing module, a virtual device in a virtual environment, including identifying a type of content that can be delivered by the virtual device;
  identifying, by the device pairing module, a physical device in a physical environment, including identifying a type of content that can be delivered by the physical device; and
  pairing, by the device pairing module, the virtual device in the virtual environment with the physical device in the physical environment only if the type of content that can be delivered by the virtual device is identical to the type of content that can be delivered by the physical device, including:
    receiving, by the virtual device in the virtual environment, virtual environment content, wherein the virtual environment content is audio or visual content; and
    in response to the virtual device in the virtual environment receiving the virtual environment content, presenting, by the physical device in the physical environment, the virtual environment content received by the virtual device in the virtual environment.

14. The computer program product of claim 13 computer program instructions that, when executed, cause a computer to carry out the steps of:
  identifying, by the device pairing module, capabilities of the virtual device in the virtual environment;
  identifying, by the device pairing module, capabilities of the physical device in the physical environment; and wherein
  pairing, by the device pairing module, the virtual device in the virtual environment with the physical device in the physical environment includes pairing the virtual device in with the physical device in dependence upon the capabilities of the virtual device and the capabilities of the physical device.

15. The computer program product of claim 13 computer program instructions that, when executed, cause a computer to carry out the step of registering, by the device pairing module, the physical device for pairing availability.

16. The computer program product of claim 13 computer program instructions that, when executed, cause a computer to carry out the step of receiving, by the device pairing module, an identification of capabilities of the physical device.

17. The computer program product of claim 13 wherein the virtual device in the virtual environment is presented as part of a gaming application.

18. The computer program product of claim 13 wherein pairing the virtual device in the virtual environment with the physical device in the physical environment further comprises pairing the virtual device in the virtual environment with the physical device in the physical environment in dependence upon a user selection of a virtual device and a user selection of a physical device.

* * * * *